United States Patent [19]

Waisman et al.

[11] Patent Number: 4,606,002

[45] Date of Patent: Aug. 12, 1986

[54] B-TREE STRUCTURED DATA BASE USING SPARSE ARRAY BIT MAPS TO STORE INVERTED LISTS

[75] Inventors: Amnon Waisman, Nashua, N.H.; Andrew M. Weiss, Paramus, N.J.

[73] Assignee: Wang Laboratories, Inc., Lowell, Mass.

[21] Appl. No.: 523,527

[22] Filed: Aug. 17, 1983

Related U.S. Application Data

[63] Continuation-in-part of Ser. No. 490,814, Aug. 17, 1983, abandoned.

[51] Int. Cl.[4] .................... G06F 15/347; G06F 7/00; G06F 12/04
[52] U.S. Cl. .................................... 364/200; 364/300
[58] Field of Search .............. 364/200, 900, 300; 340/347 DD

[56] References Cited

U.S. PATENT DOCUMENTS

| | | | |
|---|---|---|---|
| 3,593,309 | 7/1971 | Clark et al. | 364/900 |
| 3,602,895 | 8/1971 | Loizides | 364/900 |
| 3,603,937 | 9/1971 | Loizides et al. | 340/347 DD |
| 3,643,226 | 2/1972 | Loizides et al. | 364/900 |
| 3,646,524 | 12/1969 | Clark et al. | 364/300 |
| 3,651,843 | 3/1972 | Clark et al. | 364/200 |
| 3,670,310 | 6/1972 | Bharwani et al. | 364/200 |
| 3,916,387 | 10/1972 | Woodrum | 364/200 |
| 4,030,078 | 6/1977 | Kluge | 364/200 |
| 4,220,103 | 9/1980 | Chang et al. | 364/900 |
| 4,283,771 | 8/1981 | Chang | 364/900 |
| 4,553,206 | 11/1985 | Smutek et al. | 364/300 |

OTHER PUBLICATIONS

W. Schneider et al, *Klaukon—A Microprocessor System for Free Text Acquisition with Automatic Error Checking, Semi-Automatic Indexing and Retrieval*, Conf.: Proceedings of the IFIP-IMIA(TC4) Working Conf., Rome, Italy (Feb. 6-8, 1980), pp. 193-214.

A. Waisman, *A Flexible Generalized Information System*, Masters Thesis, Israel Institute of Technology (Haifa, Jun. 1974) pp. 1-111.

*Primary Examiner*—Harvey E. Springborn
*Assistant Examiner*—A. Williams
*Attorney, Agent, or Firm*—Michael H. Shanahan; Gordon E. Nelson

[57] ABSTRACT

Variable length data (e.g., for hospital patients) is embedded in a B-tree type index structure of a relational data base. A logically related inverted B-tree index is used to access the original index. Access time, and storage space for the inverted lists, are decreased by data compression techniques and by encoding certain inverted list parameters in sparse array bit maps.

14 Claims, 10 Drawing Figures

FIG. 1

Patient Data Table (RI = 47)

| RSN | Name (FI=1) | Address (FI=2) | City (FI=3) | Illness (FI=4) |
|-----|-------------|----------------|----------------|----------------|
| 119 | Aaron | 31 Main St. | Boston, MA | Appendicitis |
| 120 | Able | 14 Wall St. | Arlington, MA | Pneumonia |
| 121 | Abraham | 21 New Ave. | Dover, NH | Flu |
| 122 | • | • | • | • |
| • | • | • | • | • |
| • | • | | • | |
| • | | | | |

Doctor Data Table (RI = 17)

| RSN | Name (FI=1) | Emergency Phone (FI=18) | Office Address (FI=24) |
|-----|-------------|-------------------------|------------------------|
| 4 | Freud | (617) 123-8086 | 2345 Longwood Ave. |
| 5 | Livingston | (617) 321-8088 | 24 Apple Terrace |
| 6 | Salk | (417) 980-6800 | 2141 2nd St. |
| • | • | • | • |
| • | • | • | • |
| • | • | • | |

FIG. 2

| | KEY | | | DATA |
|---|---|---|---|---|
| | RI | RSN | FI | Data |
| 42a→ | 47 | 119 | 1 | Aaron |
| 44a→ | 47 | 119 | 2 | 31 Main St. |
| 46a→ | 47 | 119 | 3 | Boston, MA |
| 48a→ | 47 | 119 | 4 | Appendicitis |
| | • | | | |
| | • | | | |
| | • | | | |
| 50a→ | 47 | 120 | 1 | Able |

FIG. 3

| | CL | KL | KEY | DL | Data |
|---|---|---|---|---|---|
| 40 → | | | | | |
| 42b → | 0 | 6 | 471191 | 5 | Aaron |
| 44b → | 5 | 1 | 2 | 11 | 31 Main St. |
| 46b → | 5 | 1 | 3 | 3 | Boston, MA |
| 48b → | 5 | 1 | 4 | 5 | Appendicitis |
| ... | | | | | |
| 50b → | 3 | 3 | 201 | 4 | Able |

FIG. 4

| KEY | | | POINTER |
|---|---|---|---|
| RI+1 | FI | Data | RSN |
| 48 | 3 | Boston | 119 |
| | | | 124 |
| | | | 156 |
| | | | 308 |
| 48 | 3 | Cambridge | 94 |
| | | | 115 |
| | | | 199 |
| | | | ... |

| KEY | DATA |
|---|---|
| RI  FI  Data  RV | Sparse Array (3-73 Bytes) |

FIG. 7

| Bit Integer | Range Value |
|---|---|
| 00000101 | 5 |
| 01000000  01100100 | 100 |

FIG. 8

|      |            | 60 | 62 | 64 |
|      |            | ↓  | ↓  | ↓  |

| RSN | Name (FI=1) ••• | Patients (FI=54) | RV | Values represented by Sparse Array |
|-----|-----------------|------------------|-----|-----------------------------------|
| 4   | Freud •••       | 165              | 0   | 165                               |
|     |                 | 6,410            | 12  | 266                               |
|     |                 | 6,411            |     | 267                               |
|     |                 | 6,412            |     | 268                               |
|     |                 | 10,901           | 21  | 148                               |
|     |                 | 104,368          | 203 | 432                               |
|     |                 | •                | •   | •                                 |
|     |                 | •                | •   | •                                 |
|     |                 | •                | •   | •                                 |

FIG. 9

A      B      Result of A AND-NOT B

FIG. 10

B-TREE STRUCTURED DATA BASE USING SPARSE ARRAY BIT MAPS TO STORE INVERTED LISTS

CROSS REFERENCE TO RELATED APPLICATION

This application is a continuation-in-part application of copending application U.S. Ser. No. 490,814 filed Aug. 17, 1983, titled SPARSE ARRAY BIT MAP USED IN DATA BASES and assigned to the assignee of this application, now abandoned.

FIELD OF THE INVENTION

This invention is related to methods for storing data on digital computers, and in particular, to an improved data base system for storing and retrieving large amounts of data.

BACKGROUND OF THE INVENTION

Computers are used today to store vast amounts of information about anything conceivable. The data is stored in large data bases. Once the information is stored, it has to be found quickly when needed. One of the techniques used in data bases is the use of inverted lists.

Inverted lists are used in data bases to allow for fast searches. For example, in a hospital data base, a request may be issued to find all the records of patients allergic to penicillin. One slow way to get this information from the data base would be to search each and every one of the patient records, selecting the records with penicillin in the allergy field. A better way and a common practice in data bases is to maintain inverted lists in the data base. In this example, using an inverted list allows a list of all patients allergic to penicillin to be found relatively easily and quickly.

Unfortunately, inverted lists require a lot of storage, take a lot of time to create, and have to be efficiently organized to enable the data to be found quickly. Usually inverted lists take more storage space than the original data bases which they support. Most data bases use inverted lists for only selected data items and therefore allow for fast searches only on selected items.

SUMMARY OF THE INVENTION

The present invention allows for very efficient storage of the inverted lists. Using the present invention, the inverted lists typically require much less storage space than the original data base. This allows users to maintain inverted lists for all fields in the data base, rather than having to select only certain fields to conserve storage. This allows a user to do a fast search using inverted lists for any field whatsoever in the data base. In addition, because of the special and compact data structure of the inverted lists in this invention, the searches for information are performed much faster than in data bases using known structures.

Briefly, the present invention includes a data base which uses a self-descriptive index key format having variable length data fields so that the data base system manipulation is independent of the type and arrangement of the data being stored and retrieved. The data is characterized by three index variables which represent the data table, the record in that table, and a particular field within that record. Each table is composed of data imbedded in the B-tree index structure of the data base.

In order to access records using the field variables, the data base additionally includes an inverted B-tree index logically related to the original index. The operation of the index is enhanced by the use of data compression and the use of a sparse array bit map to represent the record associated with each field. The index structure within the data base allows each index variable to identify data by means of the index variables independently of the physical location in which the data is stored. The efficiency of storage is further enhanced by storing the data in variable length data records. The sparse array bit maps also be used to provide inter-record relationships for records stored in different data tables.

DESCRIPTION OF THE DRAWINGS

The improvements of the present invention over the prior art and the advantages resulting therefrom will become more apparent upon reading the following description of the preferred embodiment in which.

DESCRIPTION OF THE PREFERRED EMBODIMENT

Figure 1:
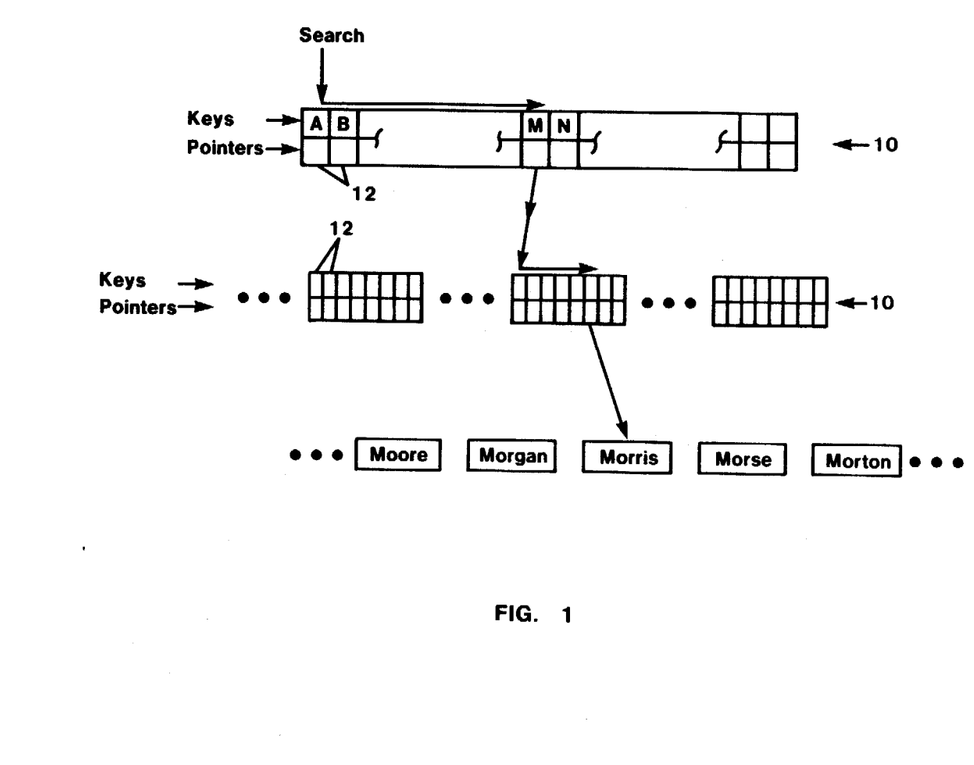
FIG. 1 is a diagram showing a B-tree type of index.

It will be helpful, before describing the invention, to briefly explain the operation of a B-tree type of index. Referring to FIG. 1, there is shown a B-tree structure for accessing records in an alphabetically arranged data base. The B-tree in FIG. 1 is made up of two levels 10, each in turn comprised of one or more blocks 12. The top level is composed of one block which is made up of a number of entries. Each of the entries is made up of a key, which identifies the data, and a pointer. In the first two levels of the B-tree, the pointers identify the location of blocks on lower levels of the B-tree which provide further indexing of the data. In the last row, the entries in each block are associated with individual records in the data base, and the pointers in the lowest level of a B-tree point to the location of this data.

To use a B-tree index, a program will search along the keys in the top level of the B-tree until it finds a key which indicates where the data is to be found. For example, if FIG. 1 is an index for a list of names and the name to be found is Morris, the program would search along the top level until it found the key (M-O) which would contain the name sought. The key associated with that key allows the program to locate the proper place to start searching in the next level, in this case, at the beginning of the M's.

The same procedure is carried out in the next level which further narrows down the search area until, at the lowest level, the pointer locates the data entry for Morris. B-trees provide a significant increase in access time and faster response time compared to a straight sequential searching of the data. B-trees are well-known methods of indexing data, and a further discussion of the use of B-tree indexes can be found in many references.

Figure 2:
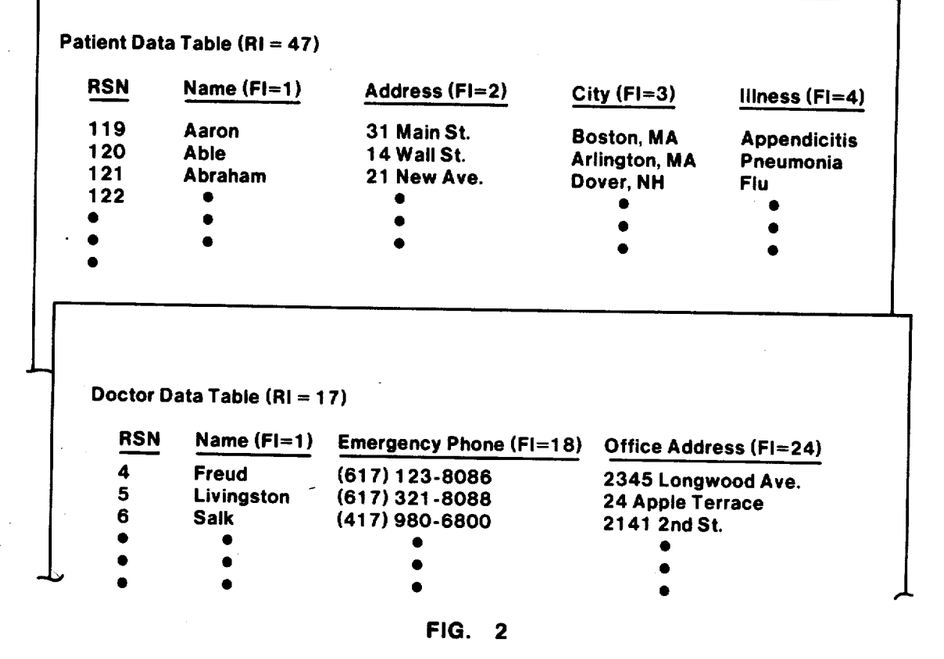
FIG. 2 is a diagram representing a data base which is used in explaining the operation of the present invention.

The data base described herein identifies all data fields within the data base by means of three numbers: the record identifier, the record serial number, and the field identifier. These terms are explained with reference to FIG. 2. FIG. 2 represents part of a data base which might be used by a hospital. The hospital data base would have many data tables including the two shown in FIG. 2, the patient table and the doctor table. Each of these tables is identified by a unique record identifier (RI) number. In FIG. 2, the the doctor data is in a table which has a RI of 17, and patient data is in the table whose RI is 47.

Each table is divided into records corresponding with the individual patients and doctors. Each patient or doctor record is identified by its own record serial number (RSN). The data for each person is divided into fields, each field representing a different piece of data associated with that person, and each of these fields has its own field identifier (FI). The data shown in FIG. 2 is only exemplary. In an actual application, a very large amount of data might well be included in the data base including a large number of tables, each with a large number of entries. For example, a large hospital might have to keep data on 2000 patients who are in the hospital at any one time and hundred of thousands of former patients, not to mention data on doctors, employees, and so forth. Clearly, such a data base will require a large amount of storage. Nevertheless, any data entry in such a data base can be uniquely identified by the three variables RI, RSN, and FI.

Figure 3:
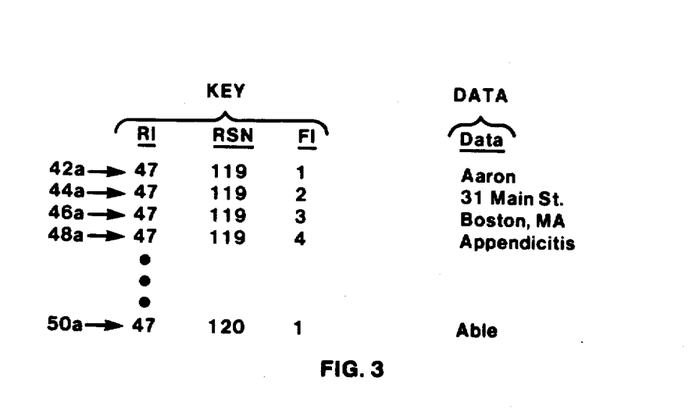
FIG. 3 shows the data of FIG. 2 as it is kept by the present invention.

Referring to FIG. 3, there is shown the result when the data from the patient data table of FIG. 2 is stored within the B-tree index itself. The entries in FIG. 3 represent the bottom level of a B-tree. In the B-tree shown in FIG. 1, each entry includes a key, to identify the data, and a pointer to locate the index or data. In the data base described herein, the pointers in the lowest level of the B-tree are replaced with the actual data. Another way of putting this is that the data in the B-tree defines itself, or is self-identifying. The key provides a means of locating any particular piece of data. In other words, the key is a "logical address" which, by following the procedure described above, can be used to access a particular piece of data.

The use of self-identifying data has several important benefits. The size of the data base may be changed and additional fields may be added to the records without any need to change programs for accessing data and without any need to reorganize the data base. This is because the logical address is independent of the physical location, or address, of the data in memory. Put another way, no matter how the B-tree is physically rearranged in memory as data is added to or deleted from the data base, and no matter where the data is actually physically located in memory, the data can always be located using the keys imbedded in the data base.

Storing the data and keys shown in FIG. 3 might appear to require a lot of overhead in terms of storage space for a large data base. In the present system, this is not the case. Information such as that shown in FIG. 3 is usually compressed before storing. For example, the data of FIG. 3 may be compressed as explained below in connection with FIG. 4. As will be seen, due to the arrangement of the data in the present data base, this compression scheme significantly reduces the amount of data to be stored. It should be appreciated, however, that other schemes of data compression are known to those in the art, and these compression schemes are, in general, applicable to the data base system of the present invention. Thus the use of a particular compression scheme in describing the referred embodiment should not be taken as a limitation on the invention.

Figure 4:
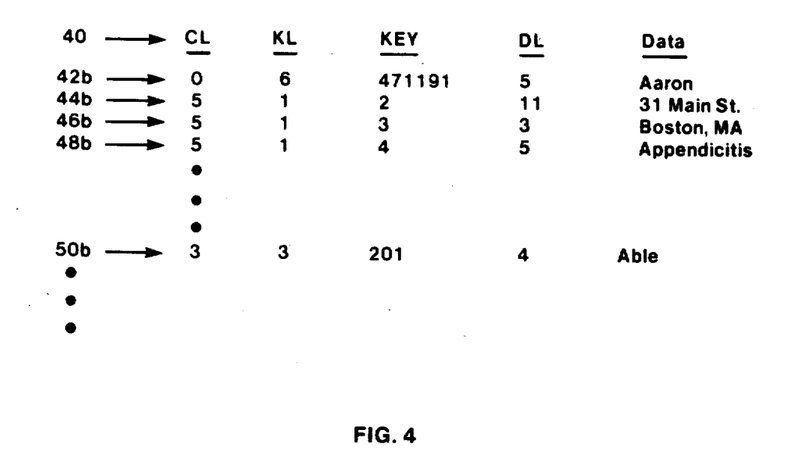
FIG. 4 shows the data of FIG. 3 as it is stored in a compressed format.

FIG. 4 shows the method by which data is compressed in the embodiment described. In FIG. 4, CL is the compression length, which is the number of initial digits in the current key which are the same as the preceding key; KL is the key length; and DL is the data length. Assume that line 42b in FIG. 4 represents the first piece of data 42a in the patient table shown in FIG. 3. Since there are no preceding entries, the compression length is zero. The key length is 6, the number of digits (bytes) in the RI-RSN-FI key. The data length is 5 for the 5 bytes of data in the name.

In the next line 44b, the compression length is 5, since the first five digits of the key are identical for both the first and second data entries. The key length for the second and subsequent entries becomes 1, since the only change in the key is the FI variable, the RI and RSN values remaining constant for the remaining fields in the first record. Lines 46b–50b in FIG. 4 are similarly compressed.

The above-described process gives quick access to data in fields that are to be accessed via the RSN key. Alone, however, this method does not provide for quick access to records based on the value of data in one of the fields associated with that record. For instance, finding a patient whose name is unknown who lives at a particular address or compiling a list of all patients who live in Boston requires a sequential search through all of the address fields of all the patient records.

Access to individual records based on data in the fields may be easily added to the data base structure described above. While most B-tree indexes require a separate B-tree for each field variable which one wishes to search, the present invention requires only a single B-tree to provide access to as many fields as desired. This is done in the following manner.

Generally, in the described embodiment, all data fields will be indexed in the inverse key table, although some fields, such as a "miscellaneous comment" field may not be. For each field to be indexed, an inverted key table is constructed in the following manner. First, the inverted key must be logically located with respect to the original data in the particular data table under consideration. In the described embodiment, this is done by assigning only odd numbers as RI values and by assigning the associated inverted key the following even number. A B-tree is then constructed with a data structure inverse to the original format. I.e., for each different field value, the inverted table will list all the records which contain that value in that field. Sometimes it is necessary to identify one or more patients in the data base using only address information, for example, all patients living in a particular area. Referring to the data base shown in FIG. 1, a geographical search may be easily implemented using the inverse lists stored in the present invention by adding one to the RI value to generate the key for the associated inverted table and then searching entries under the FI value indicating address.

Figure 5:
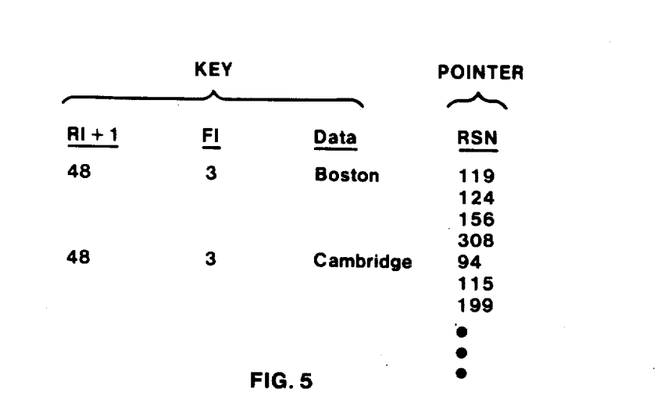
FIG. 5 shows the organization of an inverted key.

Referring to FIG. 5, an example is given of an inverted key for the city field in the data base of FIG. 3. The key is found by adding one to the RI value to get 48; the FI value corresponding to the city field is selected; the B-tree is searched to find these RI and FI values; and the data following this is searched for the desired city, in this case, Boston. The numbers following Boston are the RSN's of the patient records for Boston patients. The RSN's are actually functioning as pointers to the data, and refer to the records in the RI=47 patient data table which contain information on the patients living in Boston. The data shown in FIG. 5 can be compressed for storage in a manner similar to the compression scheme described above. As can be seen from an inspection of FIG. 5, the inverted key data will compress greatly.

There are several advantages to this method of indexing the field data. As mentioned above, the key or logical address of the data in the inverted tables is independent of the actual location in memory of the data. This allows the data base to be enlarged or modified without having to change the values of the pointers in the inverted table, and it also makes the data base independent of the type of data stored in it and thus more generally applicable to a wide variety of data bases. The arrangement of the RSN's is also advantageous for searches having multiple field keys, e.g., a search for all patients living in a particular city who have a particular illness. The RSN lists for the city and illness fields will both be arranged in numerical order. This makes it easy to determine a match by comparing two lists of RSN's and selecting the RSN's which match.

In terms of both speed and memory requirements, the access and manipulation of data in the inverted table can be further enhanced by a technique which will be referred to as a sparse array bit map. This is a method of compressing the inverted list by representing the existence of individual records in an inverted table by individual bits which require much less storage space than the individual RSN's. Using the inverted table structure shown in FIG. 5, the list of RSN's for each inverted table entry is replaced by a sparse array in which the presence of a few bits represents the occurrence of a particular record in the list. The present invention allows multi-digit RSN's to be replaced with a few bits, as will be seen below. Thus, in a large data base having tens or hundreds of thousands of records, many four- or five-digit RSN's requiring four or five bytes of storage each can be replaced with a few bits.

The sparse array bit map is generated in the following manner. First, the list of all RSN's is divided into ranges. In the described embodiment, each range includes 512 records. Each range is assigned a consecutive range value (RV). Thus, RSN's 0 through 511 would fall into the first range having a RV of 0; RSN's 512 through 1023 would have a RV of 1; and so forth. If one or more RSN's in the inverted list fall within a range, the associated RV is stored in the inverted table. Only ranges with non-null sparse arrays are defined.

Figure 6:
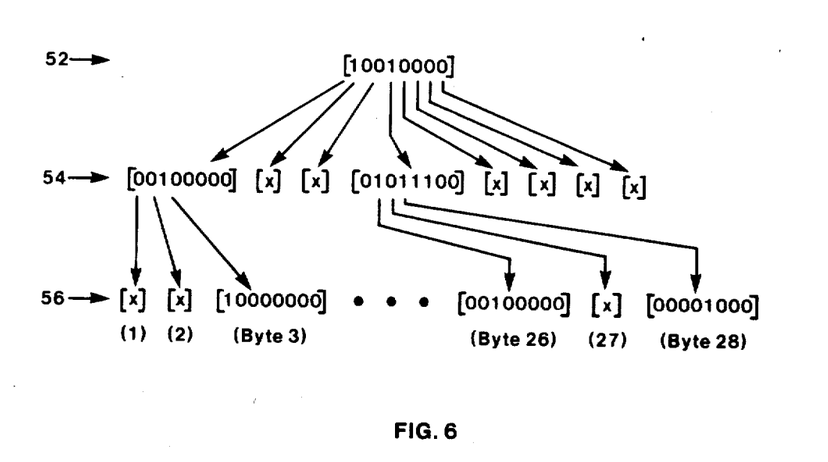
FIGS. 6 and 7 show the organization of a sparse array bit map.

The location of each RSN occurring within a range is stored in a sparse array which represents individual RSN's within a range. Referring to FIG. 6, the top line is one byte 52 in which each of the individual bits represents the occurrence in a list of at least one and possibly as many as 64 RSN's in a particular range. Each bit of the top-level byte 52 in FIG. 6 represents a corresponding eight-bit byte, shown on a second level 54 in FIG. 6, and each bit of each byte on the second level represents one eight-bit byte on a third level 56. In each upper level, a bit is set if the corresponding byte on the next lower level contains a one in any of its eight bits. There are 64 bytes having 512 bits in third level 56. Each of these 512 bits represents a corresponding RSN in the range.

The presence of a set bit (represented by a bit having a value of one in this embodiment) in any of the bit positions of byte 52 thus represents the occurrence of between 1 and 64 RSN's in the inverted list. The absence of a set bit (a zero in this embodiment) in any of the bit positions in byte 52 represents the absence of 64 RSN's in the inverted list. (A byte filled with eight zeros is represented by an "x" in the corresponding box in FIG. 6.) Therefore, the presence or absence of 512 individual RSN's can be represented by the data structure shown in FIG. 6.

For each zero in byte 52, the corresonding byte in level 54 and the corresponding eight bytes in level 56 will all be zero, and there is no need to store these nine bytes individually, since they contain redundant information. Similarly, each zero in the second level 54 represents a byte on the third level 56 with eight zeros, Thus, all of the information in the data structure shown in FIG. 6 can be stored by storing only those bytes which contain one or more ones. With the sparse array of FIG. 6, three bytes is the minimum number of bytes which must be stored to represent the occurrence of a RSN in a range. The maximum number of bytes which must be stored is seventy-three, i.e., all the bytes in levels 52, 54, and 56. This will occur only when each of the bottom level 56 bytes has at least one bit set, resulting in seventy-three bytes representing between 64 and 512 RSN's. Thus the reduction in required data storage space depends on the particular pattern of RSN's within the range.

Figure 7:
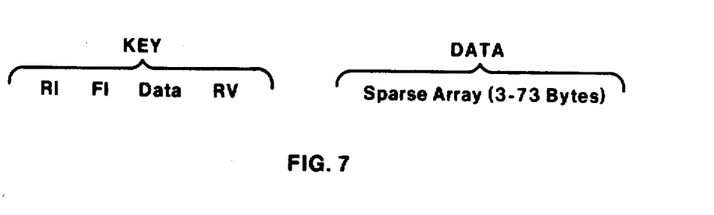

After the sparse array of FIG. 6 is constructed, the data is stored in the inverted table in the manner shown in FIG. 7, where each RV represents the range value for each range which contains at least one RSN in the inverted list, and the range is followed by 3 to 73 bytes of the corresponding sparse array. This data may then be compressed as described above before being stored in the B-tree.

The maximum number of values in each range is 512 in the described embodiment. With 8-bit bytes, the number contained in each range must be an integral power of eight. Practical considerations of disk sector lengths and access times make 512 more desirable than the next higher power of eight, 4048, in the described embodiment. In other applications, larger or smaller ranges may be preferable.

Determining the range value and the sparse array from a RSN is straightforward. The RSN is divided by the extent of each range, 512 in the described embodiment. The integer part of the result is the range number, and the remainder is the bit position within the sparse array which corresponds to that RSN.

Figure 8:
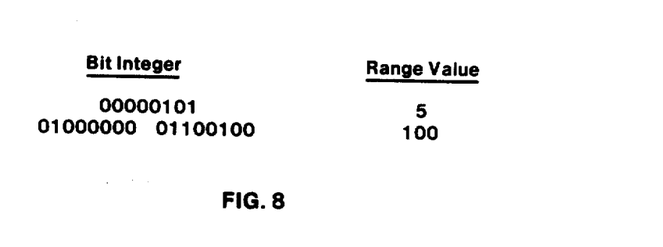
FIG. 8 shows the manner in which bit integers represent range values.

In the present embodiment, the range value is stored as a bit integer of one to four bytes. The number of bytes or length of the bit integer is stored in the first two bit positions of the first byte of the bit integer. A value of 00 indicates that the bit integer requires one byte; a value of 01 indicates that the bit integer requires two bytes; and so on. The remaining part of the first byte and any additional bytes stores the range value in binary. This is shown in FIG. 8. The top bit integer represents a range value of 5 and requires only one byte. The second bit integer represents a range value of 100 and requires two bytes. Using this format with a maximum of 4 bytes to represent the bit integer, range values up to approximately one billion can be represented. Bit integers formed in this manner have the additional advantage that all bit integers will collate correctly according to their numeric value.

Another advantage of the sparse array bit map is the ease with which lists of RSN's may be compared to find the result of logical operations which may be required to define a particular subset of the data base. This is because range values represent sets of RSN's, and set operations are thus applicable to sparse array and range values. Set operations include intersection, union, and relative difference functions, which implement logical AND, OR, and AND-NOT functions, respectively.

For example, suppose a list is to be compiled of all patients who live in Boston AND who have had the flu. This is the same as determining the intersection of the RSN lists (represented by sparse arrays) following the "flu" and "Boston" values in the inverted table. The two lists of all Boston patients and all patients with the flu may be taken directly from the inverted lists in table 48 (partially shown in FIG. 4) for the city and illness fields from the patient data table shown in FIG. 2. Next, the two lists are searched for range values which are the same. If one or more entries are found which have the same range number, the sparse arrays must then be compared. Referring to FIG. 6, it can be seen that ANDing the top level bytes from each of two sparse arrays to be ANDed (which are referred to as the "input" arrays below) will produce a byte which represents the top level byte of the "output" sparse array representing the intersection of the city RSN's and the illness RSN's. If the output array top-level byte is null, i.e., all zeros, the process need go no further, since this indicates that there are no common elements in the two inverted lists. If there are one or more bits equal to one in the output top-level byte, the corresponding second-level bytes from the input arrays are ANDed. Again, the presence of a null byte indicates that there are no common members from the RSN's represented by that byte. If the ANDing of bytes from the second level 54 results in a byte having a bit equal to one, the process is repeated for the third level 56. If there are common members of the two sets, the series of bytes produced during the above-described operation is the sparse array which represents the intersection of the two sets.

A similar procedure is followed to perform a logical OR operation to determine the union of two input arrays. The top-level bytes from the two arrays are first ORed to produce the top-level byte of the output array. Bytes on the second level are treated in one of two different ways. If the top-level bytes of both input arrays have a one in the same bit position, then the associated second-level byte of the output array is created by ORing the individual second-level bytes from each input array. If, however, only one of the top-level bytes has a one in a particular bit position, then the associated second-level byte in the output array is merely the associated second level byte from that input array. The same procedure is followed for the third level.

In the preferred embodiment, the relative difference between two sparse array bit maps is implemented as a logical AND-NOT function. In other words, given two input sparse arrays or sets A and B, the present embodiment determines the values in the set A AND NOT B. It should be noted that the complement of a sparse array is simply determined by taking the relative difference between a full sparse array and the array to be complemented.

Figure 10:
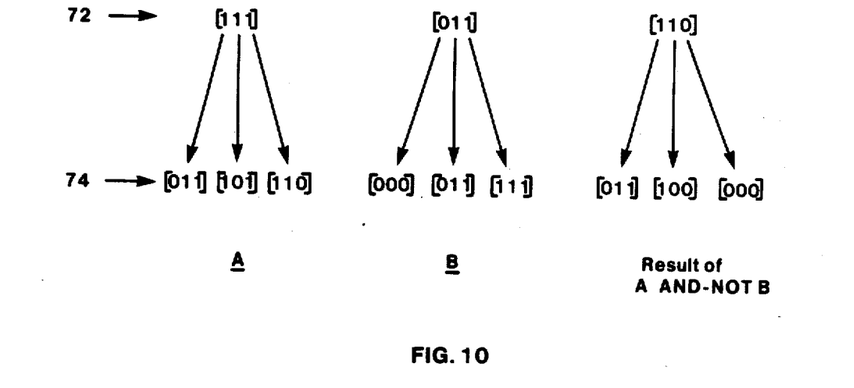
FIG. 10 illustrates the results of an AND-NOT operation on a sparse array.

Referring to FIG. 10, two simplified sparse arrays having only two levels with three bits per byte is shown to illustrate the procedure for determining the relative difference. The two sparse arrays are designated as A and B. To begin the operation, the A sparse array is copied into the area in which the result sparse will appear. Starting with top level 72, if a bit is set (i.e., equal to 1 in this embodiment) in the first array, A, and the corresponding bit is not set in the second array, B, the result of A AND-NOT B is merely A, and the byte on the next level 74 corresponding to that bit position remains the same, since it is taken directly from the A sparse array. This is shown by the leftmost byte in the lower level of the result sparse array.

If a bit is not set (i.e., is equal to zero) in the first array, A, the result of A AND-NOT B is 0, and thus the corresponding bit in the result sparse array is reset (i.e., set to zero). This is not shown in FIG. 10.

If the corresponding bits of both A and B are set (i.e., equal to one), then the corresponding bytes on the next lower level must be compared. If a bit in the A byte is set and the corresponding bit in the corresponding B byte is 0, then the corresponding bit in the result sparse array remains set. Otherwise, the corresponding bit is reset (i.e., is set to zero). This is shown in the center and righthand bytes of lower level 74 in FIG. 10. If the result of this operation is a null byte, a zero must be propagated up to the next higher level in the result sparse array. This is shown in the rightmost bytes of lower level 74.

The sparse array bit map technique described above may also be used to link records with other records stored in different data tables having different RI's. This is an efficient way to represent inter-record relationships. Referring back to FIG. 2, there is shown part of a hospital data base in which data about doctors is kept in one table and data pertaining to patients is kept in another table. Suppose, for example, a list of all patients for each doctor is to be added to the data base. This could be done by adding a patient field to the doctor data table in which the names of all patients for each doctor is stored. In the present invention, the patient data for each doctor may be efficiently kept by storing the RSN's for each patient in a sparse array bit map. The logical operations described above can also be used in implementing inter-record querys based on the inter-record connection fields described above.

Figure 9:
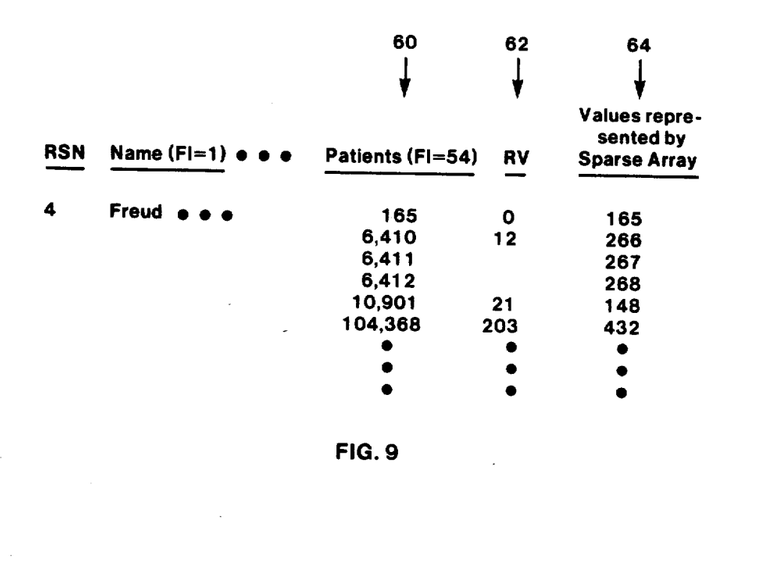
FIG. 9 shows how a sparse array replaces a list of record serial numbers in an inverted list.

FIG. 9 shows part of the doctor table from FIG. 2 which includes a field for associating each doctor with his or her patients. The patient field, having a FI of 54, contains the RSN's from the patient table (whose RI is 17) of all patients for each doctor. In the present invention, the numerical representation of each RSN is replaced by the range values and sparse arrays which represent the RSN's. In FIG. 9, for example, the first patient of Doctor Freud has a RSN, shown in column 60, which falls in the first range, having a RV equal to 0. Rather than storing the RSN directly, the present invention stores the range value and the sparse array representative of 165. The range value is shown in column 62, and column 64 shows the values within that range which the sparse array bit map represents. The second through fourth patients having RSN's 6410–6412 all fall within the same range. These patients are represented by a one-byte range value and a sparse array having three bytes. Thus, in this case, the present invention requires only four bytes to represent these three patients.

This method has several advantages over storing the patient names themselves. The storage space required by the sparse array is less than would be required by the patient's name. By including a reference to the patient's RSN in the patient table, the data base may easily access the data stored for each patient. Using a sparse array bit map to provide inter-record relationships, a list may be easily compiled not only of all patients of a particular doctor, but also, for example, of all patients of a particular doctor living in a particular area. This method of associating a patient with a doctor also avoids the problem of ambiguity between several patients having the same name in the patient table.

There has been described a new and useful method for data base storage and access. It should be appreciated that modifications and additions will be apparent to those of ordinary skill in the art in applying the teachings of the invention described herein to various applications. Accordingly, the invention should not be limited by the description herein of a preferred embodiment but, rather, the invention should be construed in accordance with the following claims.

What is claimed is:

1. A method of storing and retrieving data in a data base system comprising the steps of:
   providing a plurality of data tables, each data table including a plurality of records;
   identifying each data table by assigning a unique record index value to each data table;
   assigning each record within a data table a record serial number unique to that record within the data table;
   dividing the record serial numbers of each data table into ranges, each range including a predetermined number of record serial numbers, and each range being assigned a consecutive range value;
   dividing the records in each data table into a plurality of fields wherein each field within a data table is identified by a field index value and wherein each field within a data table contains data values of a selected type;
   providing a plurality of inverted list tables, each inverted list table being associated with a respective one of the data tables, including the steps of:
      creating a plurality of keys, each key being associated with a particular field and representing the occurance of a particular data value in that field;
      providing one or more pointers associated with each key and representative of the record serial numbers of the records which contain the data value represented by the associated key, each pointer including a range value and a sparse array bit map representative of record serial numbers;
   identifying the records in a selected data table having a specified data value stored in a selected field, including the steps of:
      determining the key which is associated with the selected field and which represents the specified data value; and
      searching the inverted list table associated with the selected data table to find the determined key; and
      retrieving the data in the records represented by the pointers associated with the determined key.

2. The method of claim 1 wherein the step of providing one or more pointers which include a sparse array bit map includes the steps of:
   determining a plurality of bottom level bytes, each byte having an equal plurality of bottom level bits, wherein the number of bottom level bits in said bottom level bytes is equal to the number of record serial numbers in each range and wherein each bottom level bit is associated with a respective one of said record serial numbers in each range;
   encoding the presence of each record serial number within a range by setting the bottom level bit which is associated with each such record serial number;
   determining a plurality of upper level bytes, including a top level byte and a plurality of bytes on one or more intermediate levels such that the total number of bits in the bytes in each level is equal to the number of bytes in the next lower level, each bit in each upper level byte being associated with a respective one of the bytes on the next lower level;
   setting the bits in the upper level bytes whose associated byte in the next lower level contains at least one set bit; and
   storing the bottom level and upper level bytes which contain one or more set bits.

3. The method of claim 2 wherein the step of determining a plurality of upper level bytes includes the steps of:
   providing a top level byte having n bits; and
   providing one intermediate level having n bytes including $n^2$ bits, whereby $n^3$ record serial numbers within a range are represented by the sparse array.

4. The method of claim 2 wherein the step of providing a plurality of upper level bytes includes the step of providing a top level byte having eight bits and one intermediate level having eight bytes of eight bits each.

5. A method of storing data in a data base comprising the steps of:
   providing a plurality of data tables, each data table including a plurality of records;
   identifying each data table by assigning a unique record index variable to each data table;
   assigning each record within a data table a record serial number unique to that record within the data table;
   dividing the record serial numbers of each data table into ranges, each range including a predetermined number of record serial numbers, and each range being assigned a consecutive range value;
   dividing the records in each data table into a plurality of fields wherein each field within a data table is identified by a field index variable and wherein each field within a data table contains data values of a selected type;
   providing a plurality of inverted list tables equal in number to the number of data tables, each inverted list table being associated with a respective one of the data tables, including the steps of:
      creating a plurality of keys, each key being associated with a particular field and representing the occurrance of a particular data value in the associated field; and
      creating one or more pointers associated with each key and representative of the record serial numbers of the records which contain the data value represented by the associated key, each pointer including a range value representative of the occurrence in the inverted list table of one or more record serial numbers within the range and a sparse array bit map associated with each range value and representative of which record serial numbers within the associated range occur in the inverted list table;

providing within a first data table from among said plurality of data tables a designated field representative of a relationship between each of the records in the first data table and selected records from a second data table; and storing said relationship in the data base by storing in the designated field data representative of the record serial numbers of said selected records from the second data table, said representative data including the range values of the record serial numbers of the selected records and a sparse array bit map associated with each range value and representative of the record serial numbers of the selected records.

6. A method of storing an inverted list of record serial numbers in a data base system including the steps of:

dividing the list of possible record serial numbers into ranges having a predetermined number of record serial numbers, each range being assigned a consecutive range value;

storing the range values for each range which contains at least one record serial number which occurs in the inverted list; and encoding the position in each stored range of each record serial number in the inverted list by means of a sparse array bit map.

7. A data base system comprising:

a plurality of data tables, each data table having a unique record index value to identify each data table;

each data table including a plurality of records;

each record within a data table being identified by a record serial number unique to that record within the data table;

the records in each data table including a plurality of fields wherein each field within a data table is identified by a field index value and wherein each field within a data table contains data values of a selected type;

means for dividing the record serial numbers of each data table into ranges, each range including a predetermined number of record serial numbers, and each range being assigned a consecutive range value;

a plurality of inverted list tables, for providing a means of rapid access to selected data values, equal in number to the number of data tables, each inverted list table being associated with a respective one of the data tables, including a plurality of keys, each key being associated with a particular field and representing the occurance of a particular data value in that field;

one or more pointers associated with each key and representative of the record serial numbers of the records which contain the data value represented by the associated key, each pointer including a range value and a sparse array bit map.

8. The data bas system of claim 7 wherein the data values are stored in the data tables in the form of a B-tree index having a plurality of levels and wherein the data values stored in the data base are stored within the B-tree as entries in the bottom level of the B-tree;

and wherein each data entry includes a key part and an associated data value, the key part including the record identifier value, the record serial number, and the field index value of the associated data value; and wherein each data value in the data base is stored immediately following the associated key, whereby each key provides a logical address of its associated data value.

9. The data base system of claim 8 wherein the sparse array bit map includes:

a plurality of bottom level bytes, each byte having an equal plurality of bottom level bits, wherein the number of bottom level bits in said bottom level bytes is equal to the number of record serial numbers in each range and wherein each bottom level bit is associated with a respective one of said record serial numbers in each range;

wherein the data base system includes means for encoding the presence of each record serial number within a range by setting the bottom level bit which is associated with each such record serial number;

a plurality of upper level bytes, including a top level byte and a plurality of bytes on one or more intermediate levels such that the number of bits in the bytes in each level is equal to the number of bytes in the next lower level, each bit in each upper level byte being associated with a respective one of the bytes on the next lower level;

and where in the data base system further includes means for setting the bits in the upper level bytes whose associated byte in the next lower level contains at least one set bit; and means for storing the sparse array bit map bytes which contain one or more set bytes.

10. The data base system of claim 9 wherein the plurality of upper level bytes include:

a top level byte having n bits; and one intermediate level having n bytes including $n^2$ bits, whereby $n^3$ record serial numbers within a range are represented by the sparse array.

11. The data base system of claim 9 wherein the plurality of upper level bytes include a top level byte having eight bits and one intermediate level having eight bytes of eight bits each.

12. A data base system comprising:

means for providing a plurality of data tables, each data table including a plurality of records;

means for identifying each data table by assigning a unique record index variable to each data table;

means for assigning each record within a data table a record serial number unique to that record within the data table;

means for dividing the record serial numbers of each data table into ranges, each range including a predetermined number of record serial numbers, and each range being assigned a consecutive range value;

means for dividing the records in each data table into a plurality of fields wherein each field within a data table is identified by a field index variable and wherein each field within a data table contains data values of a selected type;

means for providing a plurality of inverted list tables equal in number to the number of data tables, each inverted list table being associated with a respective one of the data tables, each inverted list table including:
- a plurality of keys, each key being associated with a particular field and representing the occurance of a particular data value in the associated field; and
- one or more pointers associated with each key and representative of the record serial numbers of the records which contain the data value represented by the associated key, each pointer including a range value representative of the occurance in the inverted list table of one or more record serial numbers within the range and a sparse array bit map associated with each range value and representative of which record serial numbers within the associated range occur in the inverted list table;

means for providing within a first data table from among said plurality of data tables a designated field representative of a relationship between each of the records in the first data table and selected records from a second data table; and means for storing said relationship in the data base by storing in the designated field data representative of the record serial numbers of said selected records from the second data table, said representative data including the range values of the record serial numbers of the selected records and a sparse array bit map associated with each range value and representative of the record serial numbers of the selected records.

13. The data base system of claim 12, further comprising:
- means for creating a B-tree having a plurality of levels and wherein the data values stored in the data base system are stored within the B-tree as data entries in the bottom level of the B-tree;
- wherein each data entry includes a key part and an associated data value, the key part including the record identifier value, the record serial number, and the field index value of the associated data value; and
- wherein each data value in the data base is stored immediately following the associated key, whereby each key provides a logical address of its associated data value.

14. A system for storing an inverted list representing record serial numbers in a data base system, comprising;
- means for dividing the list of possible record serial numbers into ranges having a predetermined number of record serial numbers, each range being assigned a consecutive range value;
- means for selecting the range values for each range which contains at least one record serial number which occurs in the inverted list; and
- means for encoding the position in each selected range of each record serial number in the inverted list by means of a sparse array bit map.

* * * * *